(12) United States Patent
Yang et al.

(10) Patent No.: US 10,523,927 B2
(45) Date of Patent: Dec. 31, 2019

(54) 3D DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Xue Dong, Beijing (CN); Xiaochuan Chen, Beijing (CN); Shengji Yang, Beijing (CN); Pengcheng Lu, Beijing (CN); Qian Wang, Beijing (CN); Jian Gao, Beijing (CN); Xiaochen Niu, Beijing (CN); Lei Wang, Beijing (CN); Rui Xu, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 15/327,647

(22) PCT Filed: Dec. 23, 2015

(86) PCT No.: PCT/CN2015/098485
§ 371 (c)(1),
(2) Date: Jan. 19, 2017

(87) PCT Pub. No.: WO2017/028439
PCT Pub. Date: Feb. 23, 2017

(65) Prior Publication Data
US 2017/0214906 A1    Jul. 27, 2017

(30) Foreign Application Priority Data

Aug. 20, 2015    (CN) .......................... 2015 1 0515045

(51) Int. Cl.
*H04N 13/30* (2018.01)
*H04N 13/32* (2018.01)
(Continued)

(52) U.S. Cl.
CPC .......... *H04N 13/32* (2018.05); *G02B 27/2214* (2013.01); *G02B 27/2264* (2013.01);
(Continued)

(58) Field of Classification Search
None
See application file for complete search history.

(56) References Cited

U.S. PATENT DOCUMENTS 6,670,772 B1 * 12/2003 Arnold ................ H01L 27/3258
313/504
8,705,177 B1 *  4/2014 Miao .................. G02B 27/0172
345/8
(Continued)

FOREIGN PATENT DOCUMENTS

CN         1664658 A     9/2005
CN       102692722 A     9/2012
(Continued)

OTHER PUBLICATIONS

Second Chinese Office Action, for Chinese Patent Application No. 201510515045.7, dated Dec. 29, 2017, 16 pages.
(Continued)

*Primary Examiner* — Chikaodili E Anyikire
(74) *Attorney, Agent, or Firm* — Kinney & Lange, P.A.

(57) ABSTRACT

A 3D display device and a driving method thereof are disclosed. The 3D display device comprises a grating and a
(Continued)

display panel, and the grating is divided into a bright grating cell and a dark grating cell, the grating comprising a substrate and a plurality of OLED light-emitting devices arranged on the substrate. At least a part of the plurality of OLED light emitting devices emit light to apply the operating voltage to form the bright grating cells, and the non-light emitting OLED light-emitting devices form the dark grating cells. The 3D display device is for displaying a 3D picture.

24 Claims, 9 Drawing Sheets

(51) Int. Cl.
    *H04N 13/398*     (2018.01)
    *G02B 27/22*     (2018.01)
    *H04N 13/312*     (2018.01)

(52) U.S. Cl.
    CPC ........... *H04N 13/30* (2018.05); *H04N 13/312* (2018.05); *H04N 13/398* (2018.05); *H04N 2213/001* (2013.01)

(56) References Cited

U.S. PATENT DOCUMENTS

| | | | |
|---|---|---|---|
| 2005/0168491 A1* | 8/2005 | Takahara | G09G 3/006 345/690 |
| 2007/0080905 A1* | 4/2007 | Takahara | G09G 3/3233 345/76 |
| 2011/0151607 A1* | 6/2011 | Landis | H01L 51/0023 438/46 |
| 2012/0120476 A1 | 5/2012 | Yeh et al. | |
| 2013/0069938 A1 | 3/2013 | Kim | |
| 2013/0076724 A1 | 3/2013 | Park et al. | |
| 2014/0028933 A1* | 1/2014 | Chen | G02B 27/26 349/15 |
| 2014/0063385 A1* | 3/2014 | Yang | G06F 3/044 349/15 |
| 2016/0232825 A1* | 8/2016 | Zhao | H04N 13/315 |

FOREIGN PATENT DOCUMENTS

| | | |
|---|---|---|
| CN | 202795299 U | 3/2013 |
| CN | 103855183 A | 6/2014 |
| CN | 104167177 A | 11/2014 |
| CN | 104345466 A | 2/2015 |
| CN | 104360520 A | 2/2015 |
| CN | 104536145 A | 4/2015 |
| CN | 104795425 A | 7/2015 |
| CN | 105093547 A | 11/2015 |
| CN | 105100783 A | 11/2015 |
| EP | 1956423 A1 | 8/2008 |

OTHER PUBLICATIONS

First Chinese Office Action, for Chinese Patent Application No. 201510515045.7, dated Feb. 24, 2017, 10 pages.
International Search Report and Written Opinion (including English translation of Box V) dated May 18, 2016, for corresponding PCT Application No. PCT/CN2015/098485.
Third Chinese Office Action, for Chinese Patent Application No. 201510515045.7, dated Jul. 25, 2018.
Extended European Search Report dated Jun. 19, 2018, received for corresponding European Application No. 15892063.7.

* cited by examiner

3D DISPLAY DEVICE AND DRIVING METHOD THEREOF

CROSS-REFERENCE TO RELATED APPLICATIONS

This application priority to Chinese Patent Application No. 201510515045.7, filed on Aug. 20, 2015 and entitled "3D Display Device and Drive Method thereof", the entire contents of which are hereby incorporated by reference.

TECHNICAL FIELD

The present invention relates to display technology, and more particularly, to a 3D display device and a driving method thereof.

BACKGROUND

In recent years, 3D (three-dimensional) display technology has been rapidly developed. The 3D display technology can make screen three-dimensional and realistic, and the image is no longer limited to a plane of the display, so that viewers have immersive feeling. The 3D display technology includes two categories of glasses-type and naked eye-type, in which the naked eye-type 3D display technology does not need wearing glasses and is paid more attention to as compared with the glasses-type 3D display technology.

The naked eye type 3D display device includes a display screen superimposed with a grating, wherein the grating comprises alternately arranged dark grating cells and bright grating cells. Under the action of the grating, the left and right eyes of an observer can see different images, thereby forming a 3D display effect in the observer's brain.

At present, the grating of the naked eye type 3D display device usually utilizes a liquid crystal grating. The liquid crystal grating comprises upper and lower substrates and liquid crystal molecules encapsulated therebetween, wherein the upper substrate is provided with a strip electrode arranged at intervals and the lower electrode is provided with a plane electrode. For the liquid crystal grating with an initial state of white state, different voltages are applied to the strip electrode and the plane electrode respectively to facilitate the liquid crystal molecules below the strip electrode to deflect and to prevent the light from transmitting to form the dark grating cell; and the liquid crystal molecules corresponding to the gap between the strip electrodes remain the initial state, which allows all of the light pass through to form the bright grating cells.

However, due to the liquid crystal molecules deflect insufficiently and other reasons, the dark grating cells in the liquid crystal gratings tend to have certain brightness, resulting in that a contrast between the bright grating cell and dark grating unit is lower, and in turn resulting in that the displayed 3D screen has a larger crosstalk.

SUMMARY

In order to overcome the above-mentioned deficiencies of the prior art, the present invention provides a 3D display device and a driving method thereof to solve the problem of higher 3D picture crosstalk due to the low contrast between the bright grating unit and the dark grating unit in the grating.

In order to achieve the above object, the present invention adopts the following technical schemes.

A first aspect of the present invention provides a 3D display device comprising a grating and a display panel, the grating being divided into a bright grating unit and a dark grating unit, the grating comprising a substrate and a plurality of OLED light emitting devices provided on the substrate, in which at least a part of the plurality of OLED light emitting devices emit light when an operating voltage is applied to form the bright grating units, and OLED light-emitting devices which do not emit light form the dark grating units.

In the 3D display device as mentioned above, the substrate of the grating is provided with an OLED light-emitting device. The OLED light-emitting devices emit light to form the bright grating unit, so the bright grating unit is a self-luminous structure may achieve a high brightness. As compared with a dark grating cell formed by deflecting the liquid crystal molecules in the conventional liquid crystal grating. the 3D display device of the present invention forms a dark grating cell by areas of the grating which do not emit light, so that the brightness of the dark grating cell is reduced, which is almost zero, thereby improving the contrast between the bright grating unit and the dark grating unit and reducing crosstalk in the 3D display device.

A second aspect of the present invention provides a driving method of a 3D display device for driving a 3D display device provided in the first aspect of the present invention. The driving method comprises a step of: applying an operating voltage to at least a part of the OLED light emitting devices of a plurality of OLED light-emitting devices included in a grating of the 3D display device, so that the OLED light-emitting device to which the operating voltage is applied emits light to form a bright grating cell.

Since the 3D display device driven by the driving method of the 3D display device is the 3D display device provided by the first aspect of the present invention, the driving method has the same advantageous effects as the 3D display device provided in the first aspect of the present invention, which is omitted here for brevity.

BRIEF DESCRIPTION OF THE DRAWINGS

In order to more clearly illustrate the embodiments of the present invention or the technical solutions of the prior art, the drawings which are required to be used in the embodiments or the prior art will be briefly described in the following. It will be apparent that the drawings in the following description are only some embodiments of the present invention and other drawings may be derived by those skilled in the art from the accompany drawings.

DETAILED DESCRIPTION

Figure 1:
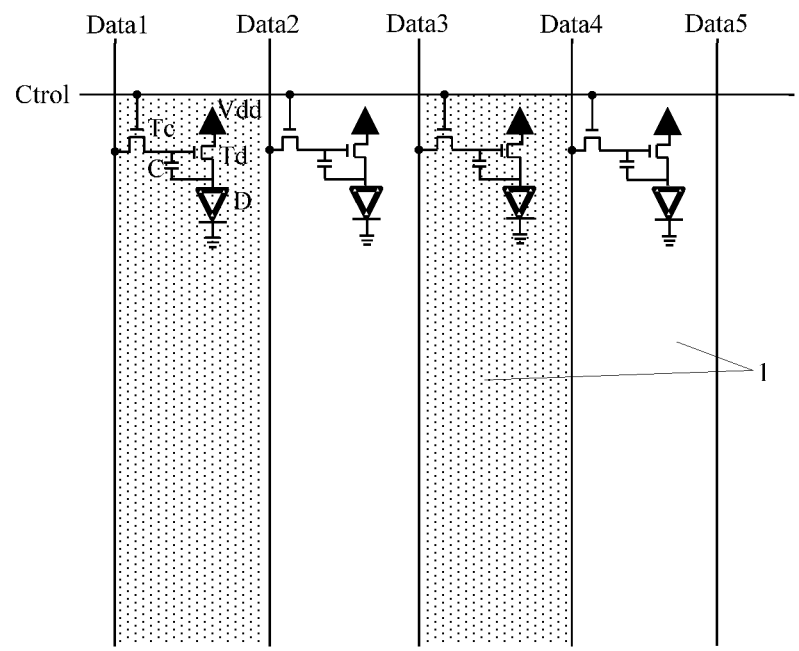
FIG. 1 is a first plan view of a grating in a 3D display device according to an embodiment of the present invention.

In order to make the above objects, features and advantages of the present invention more apparent, the technical solutions of the embodiments of the present invention will be clearly and completely described below with reference to the accompanying drawings in the embodiments of the present invention. It is obvious that the described embodiments are only a part of the embodiments of the present invention and are not all of the embodiments. All other embodiments obtained by those skilled in the art based on the embodiments of the present invention without inventive labors fall within the scope of the present invention.

An embodiment of the present disclosure provides a 3D display device comprising a grating and a display panel, wherein the grating is divided into a bright grating unit and a dark grating unit, the grating comprises a substrate and a plurality of light sources provided on the substrate, in which at least a part of the plurality of OLED light emitting devices emit light when an operating voltage is applied to form a bright grating cell, and OLED light-emitting devices which do not emit light form the dark grating units.

Correspondingly, the present embodiment also provides a driving method of a 3D display device for driving the 3D display device as mentioned above, which comprises steps of: applying an operating voltage to at least a part of the OLED light emitting devices of a plurality of OLED light-emitting devices included in a grating of the 3D display device, so that the OLED light-emitting device to which the operating voltage is applied emits light to form a bright grating cell. A region of the grating which does not emit light forms the dark grating units.

In the above-mentioned 3D display device and its driving method, the OLED light-emitting device is provided on the substrate of the grating of the 3D display device to form a bright grating cell by the OLED light emitting device emitting light. Thus, the bright grating unit is a self-luminous structure and may achieve a higher brightness. As compared with a dark grating cell formed by deflecting the liquid crystal molecules in the conventional liquid crystal grating, the 3D display device of the present embodiment forms a dark grating cell by areas of the grating which do not emit light, so that the brightness of the dark grating cell is reduced, which is almost zero, thereby improving the contrast between the bright grating unit and the dark grating unit and reducing crosstalk in the 3D display device.

In this embodiment, the OLED light-emitting device included in the grating may be a white OLED light-emitting device, and the display panel may include a color-blocking layer capable of at least blocking red light, green light and blue light to achieve color display.

It should be noted that the OLED light-emitting device described in this embodiment may be a laminated structure including an anode, a light-emitting layer, and a cathode. By applying an operating voltage to the anode and the cathode, holes in the anode and electrons in the cathode can be recombined in the light-emitting layer to excite the light-emitting material in the light-emitting layer to emit light.

In addition, the 3D display device provided by the present embodiment can be applied to any products or components having displaying function, such as a mobile phone, a tablet computer, a television, a display, a notebook computer, a digital photo frame, a navigator or the like.

On the basis of the embodiments as mentioned above, the grating in the 3D display device provided by the embodiments of the present disclosure specifically includes a plurality of repeating units, at least one control signal line, and a plurality of data signal lines provided on a substrate. A control transistor and the OLED light-emitting device are arranged in each of the repeating units, an output terminal of the control transistor is connected to an anode of the OLED light-emitting device, a cathode of the OLED light-emitting device is connected to ground; the control signal line extends in a transverse direction, and the control signal line is connected to a control terminal of the control transistor to control the turning-on or turning-off of the control transistor; and the data signal line extends in a longitudinal direction and is connected to an input terminal of the control transistor to output a voltage signal to the OLED light-emitting device from the control transistor.

It should be noted that the description of "the output terminal of the control transistor is connected to the anode of the OLED light-emitting device" includes both the case of direct connection and the case of indirect connection.

In the above mentioned grating, the control transistor is turned on or off by a control signal line to control when the voltage is applied to the OLED light-emitting device and a voltage signal is inputted to the control transistor by a data signal line, thereby implementing the aim of applying voltage to the OLED light emitting device. The above-mentioned structure and method can realize flexible control of each of the OLED light-emitting device and increase the application scope of the grating.

Figure 4:
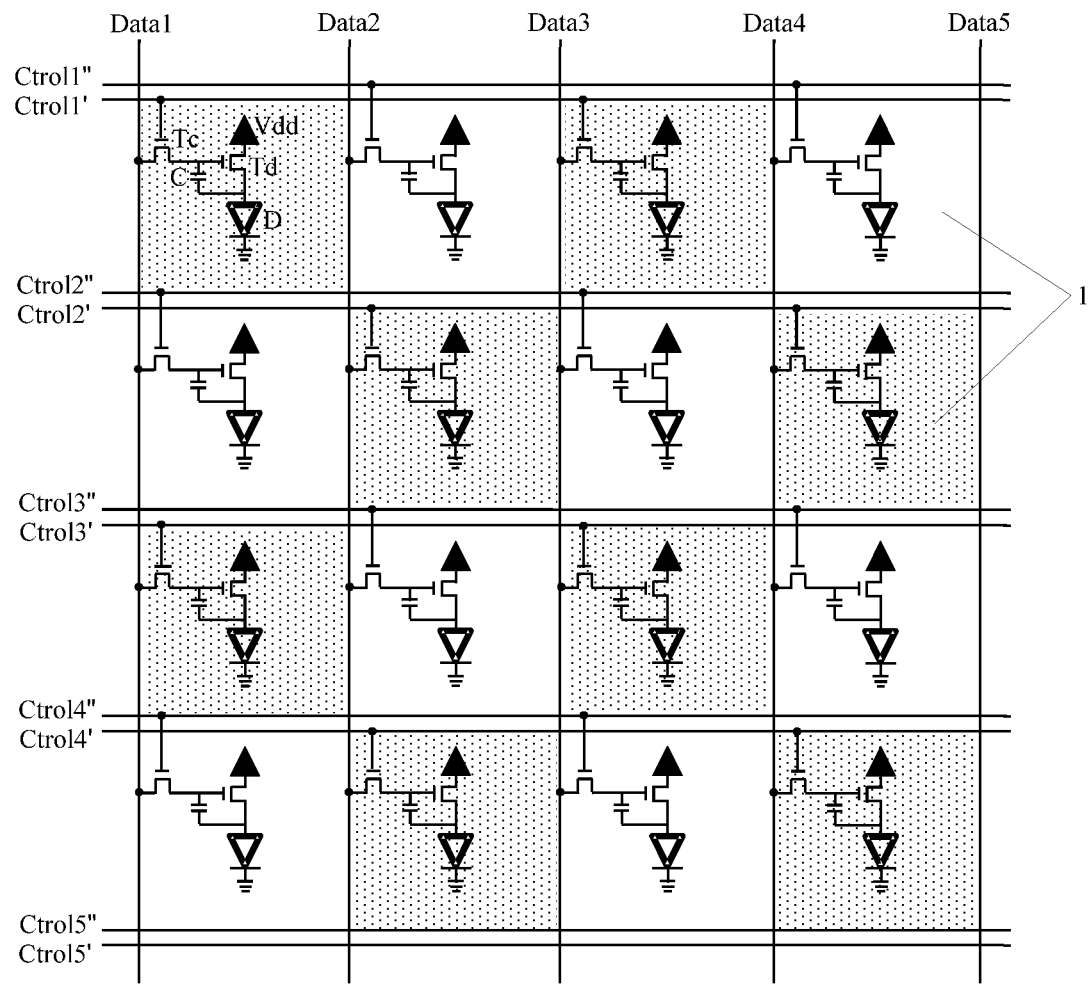
FIG. 4 is a third plan view of a grating of a 3D display device according to an embodiment of the present invention.
Figure 5:
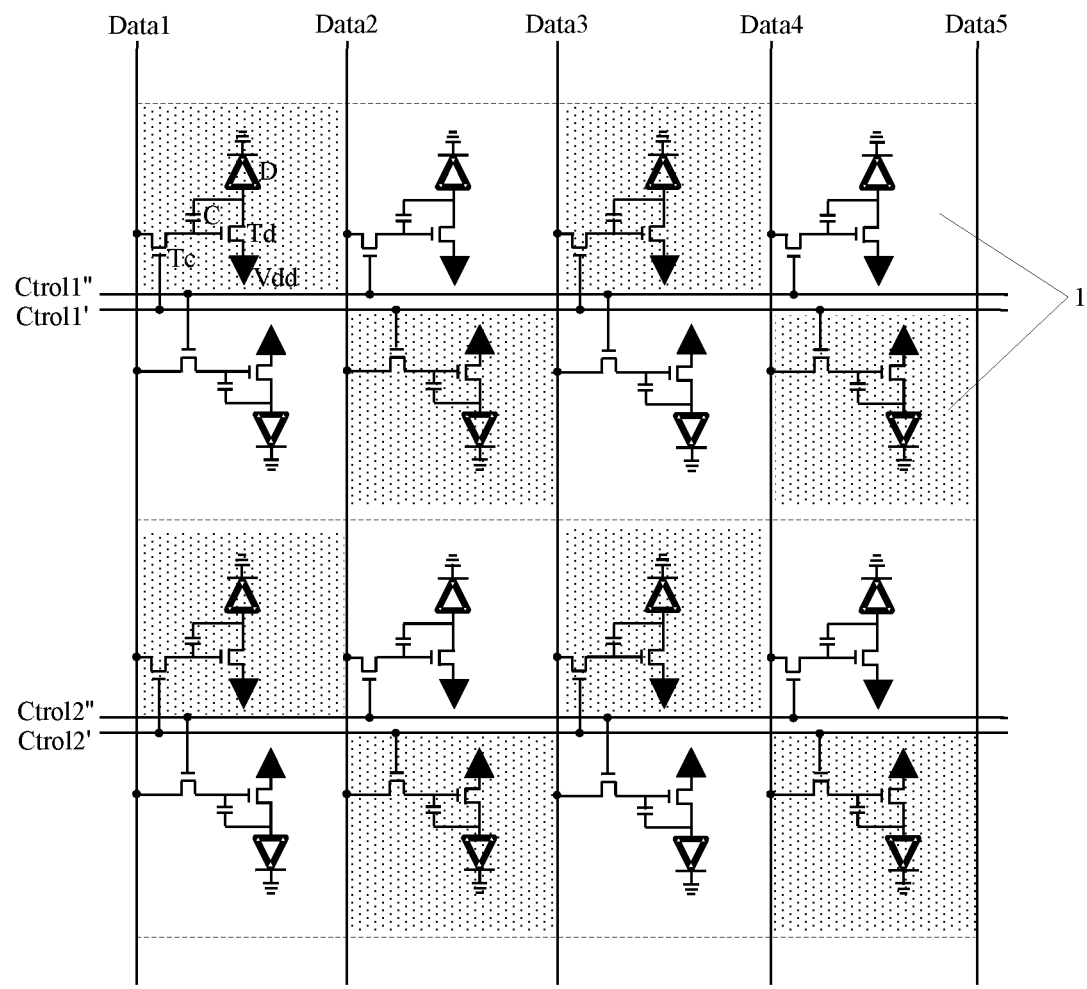
FIG. 5 is a fourth plan view of a grating in a 3D display device according to an embodiment of the present invention.

The structure of the grating as mentioned above and its driving method will be exemplarily described with reference to the accompanying drawings. In FIG. 2, Ctrol1, Ctrol3 and Ctrol5 represent odd-numbered row control signal lines, and Ctrol2 and Ctrol4 represent even-numbered row control signal lines. In FIG. 4, Ctrol1', Ctrol3' and Ctrol5' represent an odd-numbered first row control signal lines, and Ctrol2' and Ctrol4' represent an even-row first control signals; Ctrol1", Ctrol3" and Ctrol5" represents an odd-numbered second control signal line, and Ctrol2" and Ctrol4" represents an even-line second control signal line. In FIG. 5, Ctrol1' and contrl2' represent the first control signal line and Ctrol1" and Ctrol2" represent the second control signal line. In FIGS. 1-5, Data1, Data3 and Data5 represent odd-numbered column data signal lines, and Data2 and Data4 represent even-numbered data lines, respectively, in which D denotes an OLED light-emitting device.

Figure 2:
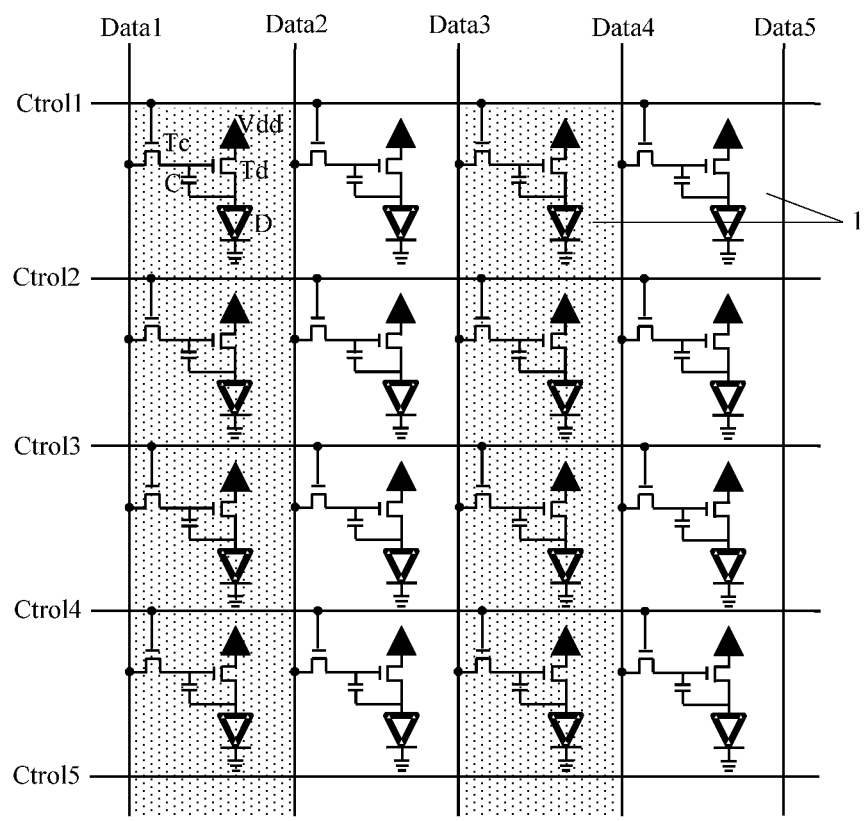
FIG. 2 is a second plan view of a grating of a 3D display device according to an embodiment of the present invention driven by a driving method.

As shown in FIG. 1, the repeating units 1 are arranged in a row, and the number of the control signal lines Ctrol is one. The control signal line Ctrol is connected to the control terminal of respective control transistors Tc. The odd-numbered column data signal lines are connected to the input terminals of the control transistor Tc at the odd-numbered position and the even-row data signal line is connected to the input terminal of the control transistor Tc at the even-numbered position. The numbers of the control signal line Ctrol and the repeating unit 1 in the grating are small; more specifically, the number of the driving circuits for driving the repeating unit 1 is small, so the structure of the grating is simple.

It should be explained that the so-called "even-numbered position" refers to even-numbered positions in the row of the control transistor Tc; similarly, the so-called "odd-numbered position" refers to odd-numbered positions in the row of the control transistor Tc.

In addition, in the grating structure as shown in FIG. 1, the specific shape of each of the repeating units 1 may be a strip extending in the longitudinal direction, the length of which is the same as that of the bright and dark grating units to be formed. Correspondingly, the OLED light-emitting device included in the repeating cell 1 is also a longitudinally extending stripe having the same length as that of the bright grating cell and the dark grating cell to be formed.

As shown in FIG. 2, the repeating units 1 are arranged in an array and there are pluralities of control signal lines. The odd-numbered row control signal lines are connected to the control terminals of the odd-numbered row control transistors Tc, and the even-numbered row control signals are connected to the input terminal of the odd-numbered row control transistor Tc; the odd-numbered column data signal line is connected to the input terminal of the odd-numbered column control transistor Tc and the even-numbered column data signal line is connected to the input terminal of the even-numbered row control transistor Tc. In the grating, the repeating units 1 are arranged in a matrix and the plurality of control signal lines control the respective repeating units 1, so that the area of the repeating unit 1 is small. That is, the area of the OLED light-emitting device controlled by each of the control transistors Tc is small so that the data signal outputted from the control transistor Tc can be duly transmitted to the entire OLED light-emitting device and the signal delay is small.

It should be noted that in the grating structure as shown in FIG. 2, the specific shape of each of the repeating units 1 may be square; accordingly, the OLED light-emitting device included in the repeating unit 1 is also square, so as to decrease the area of the OLED light-emitting device controlled by the 1 control transistor Tc in a great extent and to reduce the delay of the signal.

Also, the specific shape of each of the repeating units 1 may be rectangular, and the length thereof is smaller than that of the bright grating units and the dark grating units to be formed. Accordingly, the OLED light-emitting device included in the repeating unit 1 is also rectangular, and its length is smaller than that of the bright grating unit and the dark grating cell to be formed. Such a design can reduce the signal delay to a certain extent. As compared with a configuration in which the shape of the repeating unit 1 is square, such a design may reduce the number of the control signal lines and the number of the repeating units 1 so that the number of the driving circuits for driving the repeating unit 1 is reduced and the structure of the grating is simplified to some extent.

Figure 10:
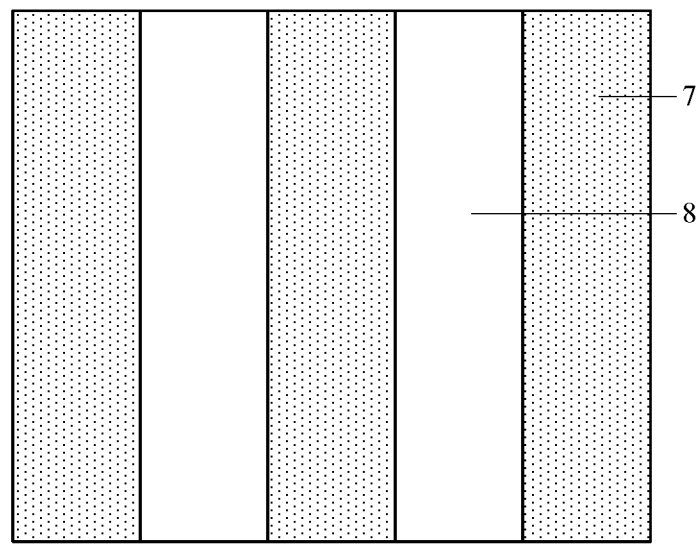
FIG. 10 is a schematic view of a grating according to an embodiment of the present invention.

When the gratings as shown in FIG. 1 and FIG. 2 are driven, a control signal may be input to all of the control signal lines in the active drive mode (a control signal is input to one control signal line for the grating as shown in FIG. 1, and the control signal is inputted to the odd-numbered row and the even-numbered row control signal lines for the gratings as shown in FIG. 2) and the data signal is inputted to the odd-numbered or even-numbered data signal lines so that the odd-numbered or even-numbered column OLED light to emit light to form the bright grating unit. The remaining columns of OLED devices do not emit light to forma dark grating unit. As shown in FIG. 10, in the final resultant gratings, the bright grating unit 7 and the dark grating unit 8 are stripe structures extending in the longitudinal direction, and the bright grating unit 7 and the dark grating unit 8 are alternately arranged in the transverse direction.

Based on the above-mentioned driving method, the width of the bright grating cell and the dark grating cell required for the 3D display device with a small resolution is large. In this case, all of the data signal lines can be averaged into a plurality of groups, a data signal is inputted to the odd-numbered or even-numbered group of data signal lines, and a control signal is input to the control signal line to cause the odd-numbered or even-numbered groups of the OLED light-emitting devices to emit light to form the bright grating unit. The remaining groups of OLED devices do not emit light to form the dark grating units. As shown in FIG. 10 again, the formed bright grating units 7 and the dark grating units 8 are stripe structure extending in a longitudinal direction, and the bright grating units 7 and the dark grating units 8 are alternately arranged in a transverse direction. In an actual application scene, it is possible to determine the widths of the bright grating units 7 and the dark grating units 8 in accordance with the magnitude of the resolution of the 3D display device and to determine the numbers of the repeating units which need to be turned on by each of the bright grating units 7 and the dark grating units 8 at the same time, that is to determine the numbers of data signal lines included in each group of data signal lines. With such a driving method, the grating can be applied to the 3D display device with different resolution, and the application range of the grating is increased.

It should be noted that for the grating as shown in FIG. 10, the method for driving the display panel in the 3D display device may comprises steps of: applying a left-eye image signal to one half of the sub-pixels in the display panel and applying a right-eye image signal to the other half of the sub-pixels; and the sub-pixels to which the left eye image signal is applied and the sub-pixels to which the right eye image signal is applied are alternately arranged in the transverse direction, so that the display panel cooperates with the grating as shown in FIG. 10 to generate a 3D display effect.

Figure 3:
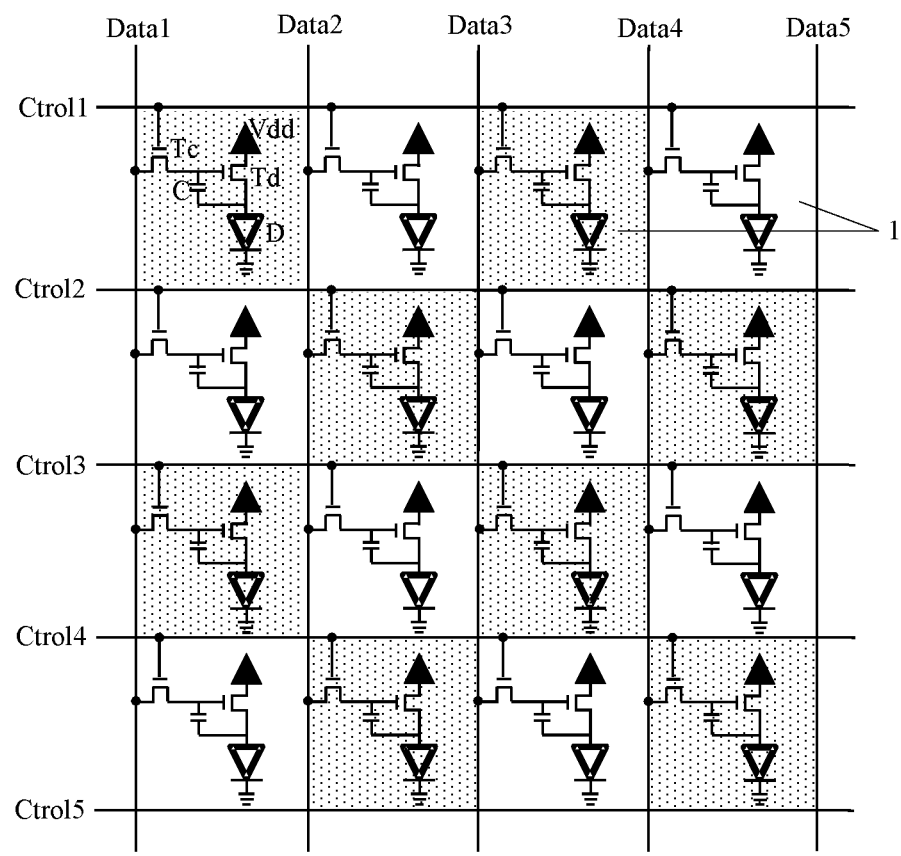
FIG. 3 is a second plan view of a grating of a 3D display device according to an embodiment of the present invention driven by another driving method.
Figure 11:
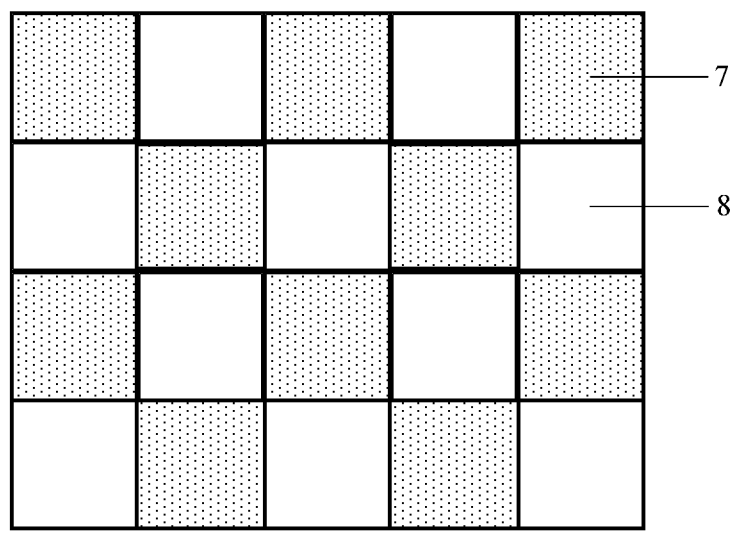
FIG. 11 is a schematic view of another grating according to an embodiment of the present invention.

Particularly, as shown in FIG. 3, the grating structure is the same as the grating structure shown in FIG. 2, and the grating structure shown in FIG. 3 is driven in the same manner by the active driving, so that the each of the repeating units 1 may be independently controlled. That is, the turning-on and turning-off of a single repeating unit 1 can be controlled during one driving cycle. In particular, during one driving cycle, a control signal is input to the control signal lines line by line; during scanning period of each of the control signal line, a data signal is inputted to the odd-numbered columns of data signal lines so that the OLED light-emitting devices at odd-numbered positions in the row emit light; or the data signals are input to the even-numbered columns of data signal lines so that the OLED light-emitting devices at even-numbered positions in the row emit light. For example, when a control signal is inputted to Ctrol1, a data signal is inputted to the odd-numbered column data signal line so that the OLED light-emitting device located in the first row and the odd-numbered column emits light to form a bright gate cell, and the OLED light emitting device located in the first row and the even-numbered column does not emit light to form a dark grating unit. When a control signal is inputted to Ctrol2, a data signal is inputted to the even-numbered column data signal line so that the OLED light-emitting device located in the second row and the even-numbered column emits light to form a bright gate cell, and the OLED light emitting device located in the second row and the oven-numbered column does not emit light to form a dark grating unit. When In the grating structure as shown in FIG. 3, the specific shape of each of the respective repeating units 1 are square. Accordingly, the OLED light-emitting device included in the repeating unit 1 is also square. On the basis of it, as shown in FIG. 11 and by utilizing the grating structure as shown in FIG. 3 and the above-mentioned driving method, in the final resultant grating, the bright grating units 7 and the dark grating units 8 are both square structures, and the bright grating units 7 and the dark grating units 8 are arranged alternately in the transverse direction and alternately in the longitudinal direction. Such a grating has the same structure in the transverse direction and in the longitudinal direction, so that the 3D display device can realize the 3D display effect in the case of the horizontal screen and the vertical screen.

It should be noted that since each of the repeating units 1 includes a storage capacitor C, it is possible to maintain the OLED light emitting devices of the respective repeating units 1 in a turned-on or turned-off state during one driving cycle, i.e. to maintain in a light emitting state or a non-emitting light state, so that the grating entirely maintain a grating pattern as shown in FIG. 11.

As shown in FIG. 4, the repeating units 1 are arranged in an array, and there are pluralities of control signal lines. The control signal line includes the first control signal line and the second control signal line, and one row of the repeating unit 1 corresponds to one first control signal line and one second control signal line. The odd-numbered row first control signal line is connected to the control terminal of the control transistor Tc located in the odd-numbered row and the odd-numbered column, and the even-row first control signal line is connected to the control terminal of the control transistor Tc located in the even-numbered row and the even-numbered column. The odd-row second control signal line is connected to the control terminal of the control transistor Tc located in the odd-numbered row and the even-numbered column, and the even-row second control signal line is connected to the control terminal of the control transistor Tc located in the even-numbered row and the odd-numbered column. The odd-numbered column data signal line is connected to the input terminal of the odd-numbered column control transistor Tc, and the even-numbered column data signal line is connected to the input terminal of the even-numbered row control transistor Tc.

When the grating as shown in FIG. 4 is driven, a control signal may be inputted to the odd-numbered column first control signal line and a data signal may be inputted to the odd-numbered column data signal line to cause the OLED light-emitting device located in the odd-numbered row and the odd-numbered column to emit light to form a bright grating unit; and a control signal may be applied to the even-numbered row of first control signal lines and a data signal may be input to the even-numbered column of data signal lines so that the OLED light-emitting devices located on the even-numbered row and the even-numbered column emit light to form a bright grating unit. The OLED light-emitting devices located in an odd-numbered row and an even-numbered column and an OLED light-emitting device located in an even-numbered row and an odd-numbered column do not emit light to form a dark grating unit.

As shown in FIG. 5, the repeating units 1 are arranged in an array, and there are pluralities of control signal lines. The control signal line includes the first control signal line and the second control signal line, and one row of the repeating unit 1 corresponds to one first control signal line and one second control signal line; each of the first control signal lines is connected to the control terminal of the control transistor Tc located in the odd-numbered row and the odd-numbered column, and each of the first control signal lines is connected to the control terminal of the control transistor Tc located in the even-numbered row and the odd-numbered column. Each of the second control signal lines is connected to the control terminal of the control transistor Tc located in the odd-numbered rows and the even-numbered columns, and each of the second control signal lines is connected to the control terminal of the control transistor Tc located in the even-numbered row and odd-numbered column. The odd-numbered column of data signal line is connected to the input terminal of the odd-numbered column of control transistor Tc, and the even-numbered column of data signal line is connected to the input terminal of the even-numbered column of control transistor.

When the grating as shown in FIG. 5 is driven, a control signal may be input to all of the first control signal lines and a data signal may be input to all of the data signal lines so that the OLED light-emitting device located in odd-numbered row and odd-numbered column and the OLED light-emitting device located in even-numbered row and even-numbered column to emit light to form a bright grating cell. The OLED light-emitting device located in an odd-numbered row and an even-numbered column and an OLED light-emitting device located in an even-numbered row and an odd-numbered column do not emit light to form a dark grating unit.

As shown in FIG. 11, by utilizing the grating structure as shown in FIGS. 4 and 5 and the above-described respective driving method, in the resultant gratings, a bright grating unit 7 and a dark grating unit 8 both are square structures. The bright grating unit 7 and the dark grating units 8 are arranged alternately in the transverse direction and alternately in the longitudinal direction. Such a grating has the same structure in the transverse direction and in the longitudinal direction, so that the 3D display device can realize the 3D display effect in the case of the horizontal screen and the vertical screen. In addition, as compared with the grating structure as shown in FIG. 4, the grating structure as shown in FIG. 5 corresponds to a configuration in which the repeating unit 1 located in the odd-numbered rows and the odd-numbered columns and the repeating unit 1 located on the even-numbered rows and even-numbered columns share the same first control signal line, and the repeating unit 1 located in the odd-numbered rows and the even-numbered columns and the repeating unit 1 located on the even-numbered rows and odd-numbered columns share the same second control signal line. Thus, the number of the first control signal lines and the number of the second control signal lines are reduced by half, which reduces the complexity of the grating structure.

It should be noted that in the grating as shown in FIG. 4 and FIG. 5, the specific shape of each of the repeating units 1 may be square; accordingly, the OLED light-emitting device included in the repeating unit 1 is also square, so that the grating has the same configuration in the traverse direction and the in the longitudinal direction.

In addition, it should be noted that for the grating as shown in FIG. 11, the method for driving a display panel in the 3D display device may comprises steps of: applying a left-eye image signal to one half of the sub-pixels in the display panel and applying a right-eye image to the other half of the sub-pixels in the 3D display device; and the sub-pixels to which the left eye image signal is applied and the sub-pixels to which the right eye image signal is applied are alternately arranged in the transverse direction and alternately arranged in the longitudinal direction so that the display panel cooperates with the grating as shown in FIG. 11 to generate 3D display effect.

For the respective gratings as mentioned above, there are two ways of forming the dark grating cells, in one of which, a data signal is not applied to the data signal lines corresponding to the dark grating units 8 so that there is not voltage across the OLED light emitting devices for forming the dark grating unit 8 and it does not emit light; in the other of which, a low-voltage data signal is applied to the data signal lines corresponding to the dark grating units 8 so that the voltage across the OLED light-emitting device for forming the dark grating units 8 cannot reach its operating voltage and is insufficient to drive the OLED light-emitting devices to emit light.

Further, in each of the above gratings, each of the repeating units 1 includes a driving circuit for driving the repeating unit 1. The control transistor Tc and the OLED light-emitting device as mentioned above are elements in the driving circuit. The driving circuit in each repeating unit 1 may include other elements in addition to the control transistor Tc and the OLED light emitting device, and the present embodiment is not limited thereto. For example, the driving circuit shown in FIG. 1 to FIG. 5 has a structure of 2T1C, that is, each of the driving circuit includes two transistors and a capacitor, and the two transistors are a control transistor Tc and a driving transistor Td; wherein the control terminal of the driving transistor Td is connected to the output terminal of the control transistor Tc, the input terminal of the driving transistor Td is connected to the power supply voltage Vdd, the output terminal of the driving transistor Td is connected to the anode of the OLED light-emitting device. That is to say, the output terminal of the control transistor Tc is indirectly connected to the anode of the OLED light-emitting device through the drive transistor Td, and both terminals of the capacitor C are connected in parallel to the control terminal and the output terminal of the drive transistor Td, respectively.

In addition, it should be noted that the OLED light-emitting devices included in each of the repeating units of the grating in the present embodiment are insulated from each other to control each of the OLED light-emitting devices independently.

On the basis of the embodiments of the present disclosure, the grating of the 3D display device provided by the following embodiments of the present disclosure is a grating by using a passive drive mode.

A specific configuration of the grating in this embodiment is that the grating comprises an electrode layer, a light-emitting layer and an electrode layer laminated on a substrate, and the two electrode layers are respectively connected to two voltage signal terminals for supplying a voltage signal.

In the grating as mentioned above, the two electrode layers of the OLED light-emitting device are respectively connected to the two voltage signal terminals, and the voltage is directly applied to the two electrode layers by the two voltage signal terminals without providing a control means for controlling the OLED light emitting device to emit light or not, so the structure of the grating and its driving methods are very simple.

The structure of the grating and its driving method by using a passive driving mode will be exemplarily described below with reference to the drawings.

Figure 6:
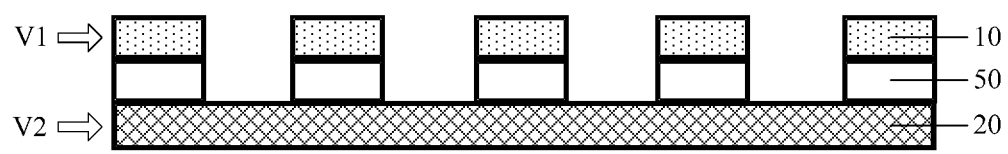
FIG. 6 is a first cross-sectional view of a grating in a 3D display device according to an embodiment of the present invention.

As shown in FIG. 6, the grating includes a first electrode layer 10, a light-emitting layer 50, and a second electrode layer 20 stacked on a substrate. The first electrode layer 10 comprises a plurality of strip electrodes longitudinally extending and spaced-apart from each other, and the strip electrodes are connected to a first voltage signal terminal for providing a first voltage signal V1, a second electrode layer 20 comprises a plane electrode connected to a second voltage signal terminal for providing a second voltage signal V2.

It should be noted that in the grating structure as shown in FIG. 6, the light emitting layer 50 has the same structure as that of the first electrode layer 10, and includes a plurality of striped luminescent material layers. The striped luminescent material layer is the same shape and size as the strip electrode included in the first electrode layer 10 and the strip luminescent material layer overlaps the strip electrode to form a bright grating cell in the region where the strip electrode is located. The light emitting layer 50 may also be a planar structure, which does not require a patterning process and is simpler than the structure of the striped luminescent material layer.

Also, the length of each strip electrode in the first electrode layer 10 is the same as that of the bright grating cell and the dark grating cell to be formed, and the width of each strip electrode and the width between the two adjacent trip electrodes may be determined based on the pixel structure of the 3D display device to which the grating is applied.

When the grating as shown in FIG. 6 is driven, a first voltage signal V1 may be applied to each of the strip electrodes of the first electrode layer 10, and a second voltage signal V2 may be applied to the plane electrode of the second electrode layer 20, and the light emitting layers corresponding to the strip electrodes emit light to form a bright grating cell. A region of the gap between the strip electrodes forms a dark grating cell. As shown in FIG. 10, in the final resultant grating, the bright grating unit 7 and the dark grating unit 8 form a stripe structure extending in the longitudinal direction, and the bright grating unit 7 and the dark grating unit 8 are alternately arranged in the transverse direction.

Figure 7:
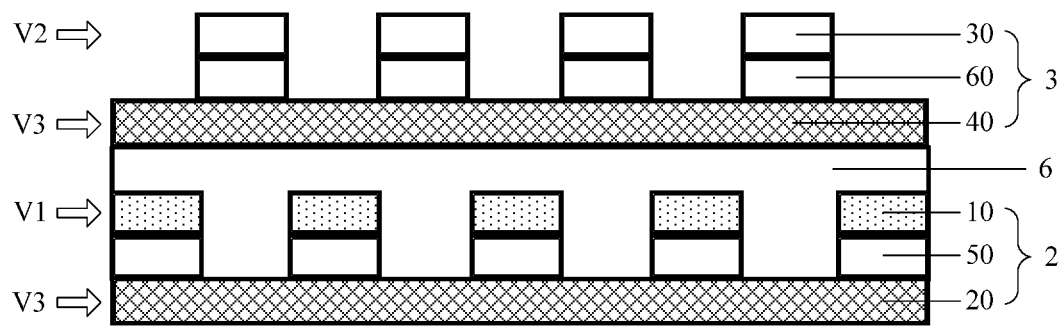
FIG. 7 is a second cross-sectional view of a grating in a 3D display device according to an embodiment of the present invention.

As shown in FIG. 7, the grating includes a bright grating cell layer 2, an insulating layer 6, and a dark grating cell layer 3 that are stacked on a substrate. The bright grating cell layer 2 includes a first electrode layer 10, a light-emitting layer 50, and a second electrode layer 20 which is laminated. The dark grating cell layer 3 includes a third electrode layer 30, a light-emitting layer 60, and a fourth electrode layer 40 which are laminated. The first electrode layer 10 comprises a plurality of first strip electrodes longitudinally extending and spaced-apart from each other. The first electrode layers are all connected to a first voltage signal terminal for providing a first voltage signal V1. The third electrode layer 30 comprises a plurality of second strip electrodes longitudinally extending, and spaced-apart from each other. The second strip electrodes are all connected to a second voltage signal terminal for providing a second voltage signal V2. A vertical projection of the second strip electrode on the substrate is alternately arranged transversely with respect to a vertical projection of the first strip electrode on the substrate; and the second electrode layer 20 and the fourth electrode layer 40 each comprises a plane electrode which is connected to a third voltage signal terminal for supplying the third voltage signal V3.

It should be noted that in the grating structure as shown in FIG. 7, the light emitting layer 50 has the same structure as that of the first electrode layer 10, and includes a plurality of striped luminescent material layers. The striped luminescent material layer has the same shape and size as the first strip electrode included in the first electrode layer 10 and the strip luminescent material layer, and the striped luminescent material layer is overlapped with the first strip electrode so as to form a bright grating unit in the region where the first strip electrode is located. The structure of the light emitting layer 60 is the same as that of the third electrode layer 30 and includes a plurality of striped luminescent material layers. The striped luminescent material layer has the same shape and size as the second strip electrode included in the third electrode layer 10 and the strip luminescent material layer is overlapped with the second strip electrode so as to form a dark grating unit in the region where the second strip electrode is located. The light-emitting layers 50 and 60 may also be planar structures, which are manufactured without requiring a patterning process can be manufactured more simply.

Also, the length of each first strip electrode in the first electrode layer 10 is the same as the length of the bright gate cell to be formed, and the length of each second strip electrode in the third electrode layer 30 is the same as that of the dark grating cell to be formed, The width of each first strip electrode and the width of each second strip electrode may be determined according to the pixel structure of the 3D display device to which the grating is applied.

When the grating as shown in FIG. 7 is driven, a first voltage signal V1 may be applied to the first strip electrode in the first electrode layer 10 and a third voltage signal V3 may be applied to the plane electrode included in the second electrode layer 20 so that the light a light emitting layer corresponding to the first strip electrode emits light to form a bright grating cell. A second voltage signal V2 is applied to the second strip electrode in the third electrode layer 30 and a third voltage signal V3 is applied to the plane electrode included in the fourth electrode layer 40, so that the light emitting layer corresponding to the second strip electrode does not emit light to form a dark grating cell. As shown in FIG. 10, the final resultant grating, the bright grating unit 7 and the dark grating unit 8 both are stripe structures extending in the longitudinal direction, and the bright grating unit 7 and the dark grating unit 8 are alternately arranged in the transverse direction. The dark grating cell 8 is formed by applying the second voltage signal V2 to the third electrode layer 30 and applying the third voltage signal V3 to the fourth electrode layer 40 to further reduce the brightness of the dark grating unit 8, thereby increasing contrast of the bright grating unit 7 and the dark grating unit 8.

It should be noted that for the grating as shown in FIG. 10, the method for driving a display panel in the 3D display device comprises steps of: applying a left-eye image signal to one half of the sub-pixels in the display panel and applying a right-eye image signal to the other half of the sub-pixels; and the sub-pixels to which the left-eye image signal is applied and the sub-pixels to which the right-eye image signal is applied are alternately arranged in the transverse direction so that the display panel cooperates with the grating as shown in FIG. 10 to generate a 3D display effect.

Figure 8:
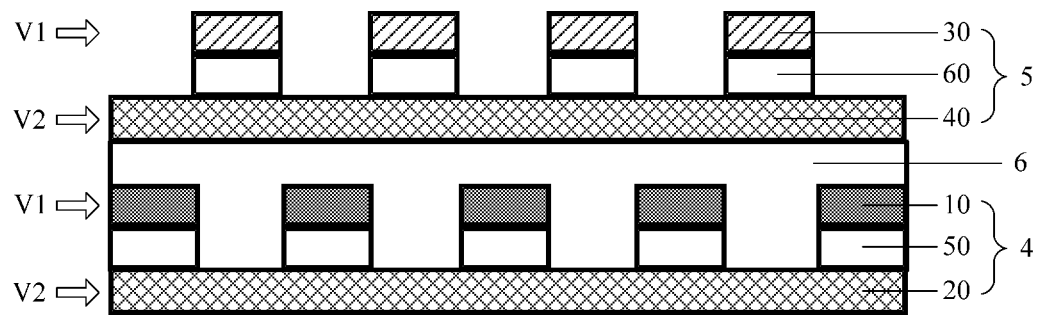
FIG. 8 is a third cross-sectional view of a grating in a 3D display device according to an embodiment of the present invention.

As shown in FIG. 8, the grating includes a first grating forming layer 4, an insulating layer 6, and a second grating forming layer 5 laminated on a substrate. The first grating forming layer 4 includes a first electrode layer 10, a light-emitting layer 50, and a second electrode layer 20 which are stacked. The second grating forming layer 5 includes a third electrode layer 30, a light emitting layer 60, and a fourth electrode layer 40 which are stacked. The first electrode layer 10 comprises a plurality of first strip electrodes longitudinally extending and spaced-apart from each other, and the first strip electrodes are connected to a first voltage signal terminal for providing a first voltage signal V1. The second electrode layer 20 includes a plurality of second strip electrodes extending in the transverse direction and spaced apart from each other, and the second strip electrodes are connected to a second voltage signal terminal for supplying a second voltage signal V2. The third electrode layer 30 comprises a plurality of third strip electrodes longitudinally extending and spaced apart from each other, and the third strip electrodes are connected to a first voltage signal terminal for providing a first voltage signal V1. The fourth electrode layer 40 includes a plurality of fourth strip electrodes transversally extending and the fourth strip electrodes are connected to the second voltage signal terminal for supplying the second voltage signal V2.

Figure 9:
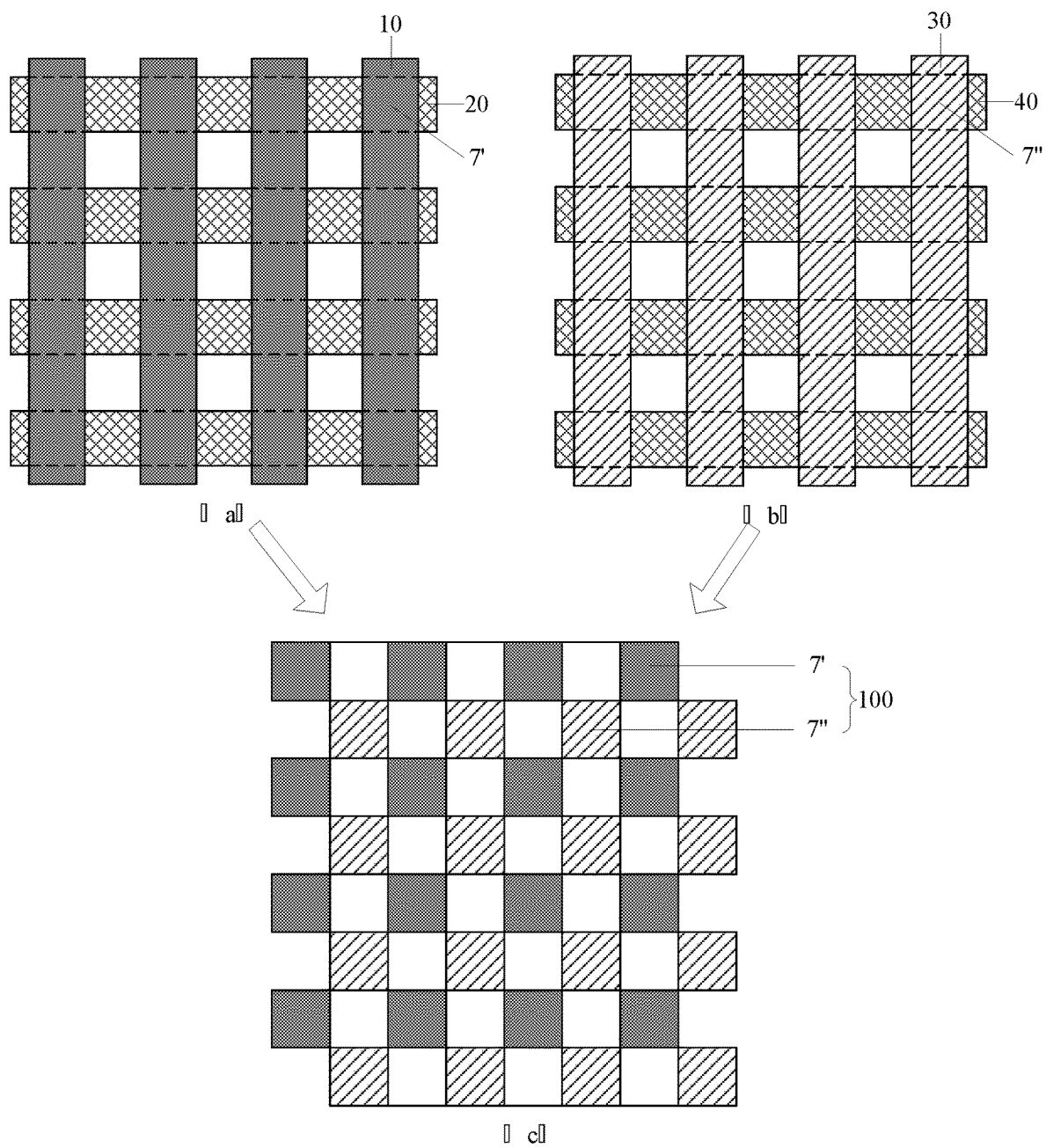
FIG. 9 is a plan exploded structural view of the grating shown in FIG. 8.

As in FIG. 9 (*a*), the overlapping portion of the first strip electrode of the first electrode layer 10 and the second strip electrode of the second electrode layer 20 is the first overlapping portion 7'; and as shown in FIG. 9 (*b*), the overlapping portion of the third strip electrode of the third electrode layer 30 and the fourth strip electrode of the fourth electrode layer 40 is the second overlap portion 7". The first grating forming layer 4 and the second grating forming layer 5 in the direction parallel to the substrate are such that the first overlapping portion 7' and the second overlapping portion 7" are shifted from each other, both of which neither are in the same row nor in the same columns, i.e., the vertical projections of the first overlapping portion 7' on the substrate and the second overlapping portion 7" are alternately arranged in the transverse and longitudinal directions.

It should be noted that in the grating as shown in FIG. 8, the light emitting layer 50 may exist only in a region corresponding to the first overlapping portion 7', and the light emitting layer 50 includes a plurality of square light emitting material layers so as to form a portion of the bright grating cell in an area corresponding to the first overlapping portion 7'. The light emitting layer 60 may exist only in a region corresponding to the second overlapping portion 7", and the light emitting layer 60 includes a plurality of square luminescent material layers to form another portion of the bright grating units in the region corresponding to the second overlapping portion 7". The light-emitting layers 50 and 60 may also be planar structures, which may be manufactured without a patterning process and can be manufactured more simply.

Furthermore, the side length of the first overlapping region 7' is identical to that of the second overlapping portion 7", i.e. the width of the first strip electrode, the width of the second strip electrode, the width of the third strip electrode, the width of the third strip electrode and the width of the fourth strip electrode are equal to each other, which may be identical to the side length of the bright grating unit to be formed and may be determined according to the pixel structure of the 3D display device to which the grating is applied.

When the grating as shown in FIG. 8 is driven, a first voltage signal V1 may be applied to the first strip electrode in the first electrode layer 10 and a second voltage signal V2 may be applied to the second electrode in the second electrode layer 20, so that a light emitting layer corresponding to the first overlapping portion 7' emits light to form a part of the bright gate cells; a first voltage signal V1 is applied to the third strip electrode in the third electrode layer 30, and the second voltage V2 is applied to the fourth strip electrode in the fourth electrode layer 40, so that the light emitting layer corresponding to the second overlapping portion 7" emits light to form another part of the bright grating unit. The part of the bright grating unit at the first overlapping portion 7' and the other part of the bright grating units at the overlapping portion 7" form all of the bright grating units. The regions other than the first overlap portion 7' and the second overlap portion 7" cannot emit light to form a dark grating unit. As shown in FIG. 11, in the resultant grating, both of the bright grating unit 7 and the dark grating unit 8 are square and are arranged alternately arranged in the transverse direction and in the longitudinal direction. Such a grating has the same structure in the transverse direction and in the longitudinal direction, so that the 3D display device can realize the 3D display effect in the case of the horizontal screen and the vertical screen.

It should be noted that for the grating as shown in FIG. 11, the method of driving the display panel in the 3D display device is to apply a left-eye image signal to one half of the sub-pixels in the display panel and apply a right-eye image signal to the other half of the sub-pixels, The sub-pixels to which the left eye image signal is applied and the sub-pixels to which the right eye image signal is applied are alternately arranged in the transverse direction and alternately arranged in the longitudinal direction so that the display panel cooperates with the grating shown in FIG. 11 to generate a 3D display effect.

It should be noted that among the above three types of gratings by using the passive driving method, one of the first electrode layer 10 and the second electrode layer 20 is the anode of the OLED light-emitting device, and the other is the cathode of the OLED light-emitting device, the positions of which are interchangeable. One of the third electrode layer 30 and the fourth electrode layer 40 is the anode of the OLED light-emitting device and the other is the cathode of the OLED light-emitting device, and the positions of which are interchangeable.

An embodiment of the present disclosure provides a 3D display device in which a grating is provided on a back surface of the display panel and the display panel is a liquid crystal display panel.

Since the grating is provided on the back surface of the liquid crystal display panel and can emit light, the grating can provide light necessary for the liquid crystal display panel to display the screen, thereby greatly thinning the whole thickness of the 3D display device in place of the backlight module in the liquid crystal display device.

Figure 12:
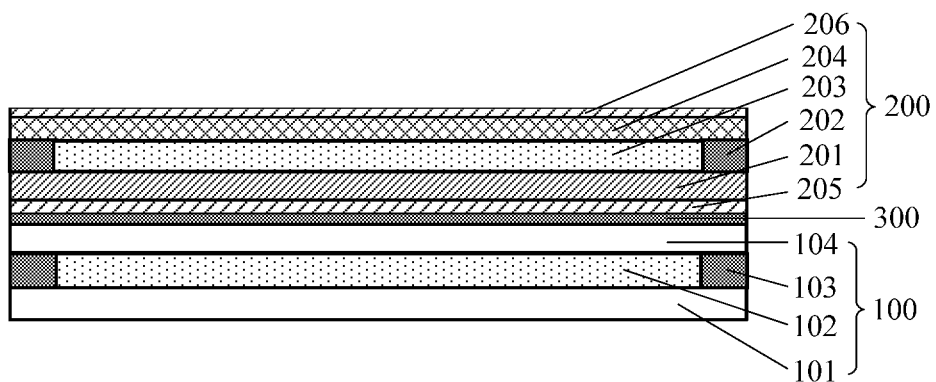
FIG. 12 is a first cross-sectional view of a 3D display device according to an embodiment of the present invention.

In particular, as shown in FIG. 12, in the 3D display device provided by the present embodiment, the grating 100 may include, in addition to the substrate 101 and the OLED light-emitting device, a sealant 103 provided around the film layer 102 where the OLED light-emitting device is positioned and a grating encapsulation substrate 104 covering the film layer 102 where the OLED light-emitting device is disposed. The liquid crystal display panel 200 includes a TFT (Thin Film Transistor) array substrate 201 and a CF (Color Film) substrate 204 disposed opposite to each other, a liquid crystal layer 203 sandwiched between the TFT array substrate 201 and the CF substrate 204, a sealing resin 202 surrounding the liquid crystal layer 203, a first polarizing plate 205 attached to the outside of the TFT array substrate 201, and a second polarizing plate 206 attached to the outside of the CF substrate; and the grating 100 is spliced to the liquid crystal display panel 200 by optical adhesive.

Figure 13:
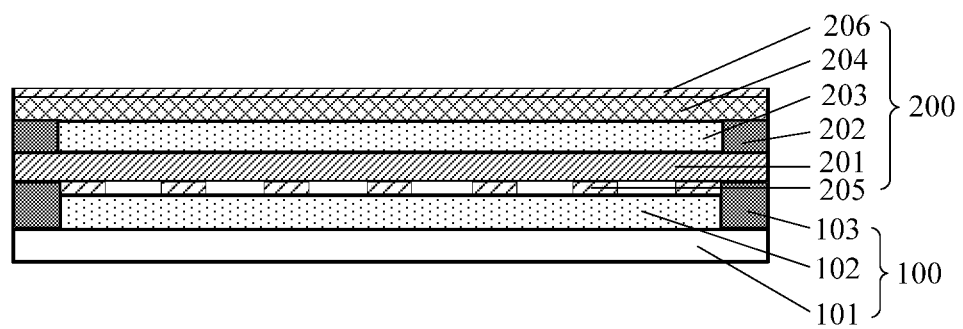
FIG. 13 is a second cross-sectional view of a 3D display device according to an embodiment of the present invention.

In order to further reduce the overall thickness of the 3D display device, the grating 100 and the liquid crystal display panel 200 can share a single substrate. As shown in FIG. 13, the first polarizer 205 of the liquid crystal display panel 200 in the 3D display device may be, in particular, a wire-grid polarizer having a main structure including a plurality of stripe-like patterns disposed at outside of the TFT array substrate 201 (i.e., the side of the TFT array substrate 201 facing away from the liquid crystal layer 203), and the TFT array substrate 201 simultaneously functions as the grating encapsulation substrate 104 of the grating 100.

Figure 14:
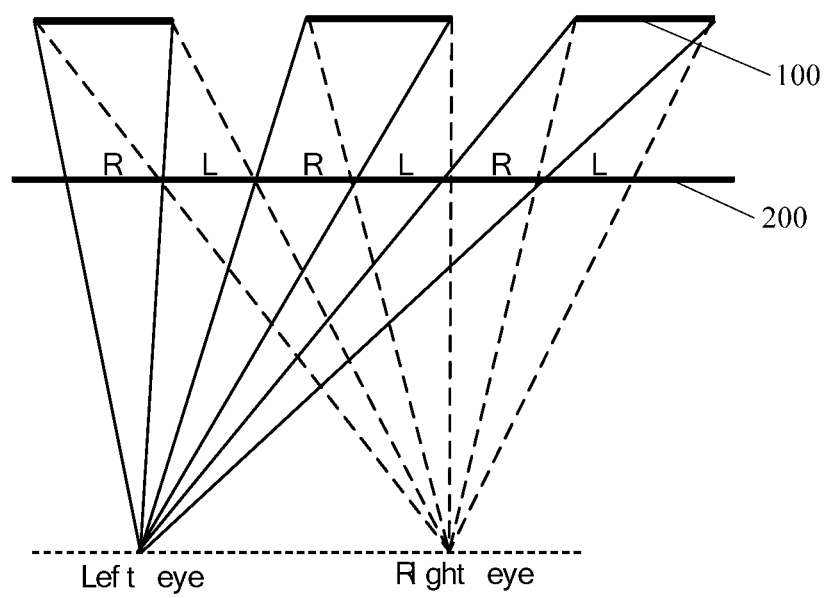
FIG. 14 is an optical path diagram of a 3D display device according to an embodiment of the present invention.

The 3D display device of the present embodiment provides the basic principle of displaying a 3D picture in which one half pixel of the liquid crystal display panel 200 displays a left-eye image and the other half of which displays a right-eye image, as shown in FIG. 14, wherein there is a certain spatial difference between the left-eye images and the right-eye images, and the pixels L for displaying the left-eye image and the pixels R for displaying the right-eye image are arranged alternately. Since the liquid crystal display panel 200 is superimposed on the grating 100, and the grating 100 includes alternately arranged bright grating units and dark grating units, and the viewer has a certain distance between the left and right eyes, i.e. there is a parallax between the left and right eyes, the left eye can only receive the light through the L pixels to see the left eye image, and the right eye can only receive the light through the R pixels to see the right eye image. Because there is a spatial difference between the left eye image and the right eye image, the 3D image is formed in the brain after calculation and synthesis of the brain.

The above description is only a specific embodiment of the present invention, but the scope of the present invention is not limited thereto, and any person skilled in the art can easily conceive of variations or substitutions within the technical scope of the present invention. And is intended to be within the scope of the present invention. Accordingly, the scope of protection of the present invention should be determined by the scope of the claims.

We claim:

1. A 3D display device, comprising a grating and a display panel, the grating being divided into a bright grating cell and a dark grating cell, wherein the grating comprises:
   a substrate; and
   a plurality of OLED light emitting devices arranged on the substrate,
   wherein at least a first part of the plurality of OLED light-emitting devices which emit light when an operating voltage is applied thereto form the bright grating cell, and a second part of the plurality of OLED light-emitting devices which do not emit light form the dark grating cell;
   wherein the grating comprises a first grating layer, an insulating layer and a second grating layer which are laminated on the substrate, the first grating layer comprises a first electrode layer, a first light-emitting layer and a second electrode layer laminated together, and the second grating layer comprises a third electrode layer, a second light-emitting layer and a fourth electrode layer laminated together; and
   wherein,
   the first electrode layer includes a plurality of first strip electrodes longitudinally extending and spaced-apart from each other, the first strip electrodes being connected to a first voltage signal terminal for providing a first voltage signal, the third electrode layer includes a plurality of second strip electrodes longitudinally extending and spaced-apart from each other, the second strip electrodes each connected to a second voltage signal terminal for providing a second voltage signal, and a vertical projection of the second strip electrodes on the substrate and a vertical projection of the first strip electrodes on the substrate being alternately arranged in the transverse direction, and the second electrode layer and the fourth electrode layer each include a plane electrode connected to a third voltage signal terminal for supplying a third voltage signal.

2. The 3D display device according to claim 1, wherein the grating includes a plurality of repeating units, at least one control signal line and a plurality of data signal lines provided on the substrate; wherein:

each of the repeating units is provided with a control transistor and an OLED light-emitting device, an output terminal of the control transistor is connected to an anode of the OLED light-emitting device, and a cathode of the OLED light-emitting device is connected to ground;

the at least one control signal line extends in a transverse direction, and each control signal line is connected to a control terminal of the control transistor of at least one of the repeating units to control the control transistor to turn on or turn off; and the data signal lines extend in a longitudinal direction, and each data signal line is connected to an input terminal of the control transistor of a respective one of the plurality of repeating units to cause the control transistor to output a voltage signal to the OLED light emitting device.

3. The 3D display device according to claim 2, wherein:
the repeating units are arranged in a line and there is one control signal line;
the control signal line is connected to the control terminal of each respective control transistor of the repeating units; and
an odd-numbered column of the data signal lines is connected to the input terminal of the control transistor in an odd-numbered position and an even-numbered column of the data signal lines is connected to the input terminal of the control transistor in an even-numbered position.

4. The 3D display device according to claim 2, wherein:
the repeating units are arranged in an array, and there are plurality of control signal lines;
an odd-numbered row of the control signal lines is connected to the control terminal of an odd-numbered row of control transistors, and an even-numbered row of the control signal lines is connected to the control terminal of an even-numbered row of control transistors; and
an odd-numbered column of the data signal lines is connected to the input terminal of an odd-numbered column of control transistors, and an even-numbered column of the data signal lines is connected to the input terminal of an even-numbered column of control transistors.

5. The 3D display device according to claim 2, wherein:
the repeating units are arranged in an array, and there are a plurality of control signal lines, the control signal lines include first control signal lines and second control signal lines, and one row of repeating units corresponds to the first control signal lines and the second control signal lines;

an odd-numbered row of the first control signal lines is connected to the control terminal of control transistors in an odd-numbered row and odd-numbered column, and an even-numbered row of the first control signal lines is connected to the control terminal of control transistors in an even-numbered row and even-numbered column;

an odd-numbered row of the second control signal lines is connected to the control terminal of the control transistors in the odd-numbered row and the even-numbered column, and an even-numbered row of the second control signal lines is connected to the control terminal of the control transistors in the even-numbered row and the odd-numbered column; and an odd-numbered column of the data signal lines is connected to the input terminal of the control transistors in the odd-numbered column, and an even-numbered column of the data signal lines is connected to the input terminal of the control transistors in the even-numbered column.

6. The 3D display device according to claim 2, wherein:
the repeating units are arranged in an array, and there are plurality of control signal lines, and the control signal lines include first control signal lines and second control signal lines, and one row of repeating units corresponds to the first control signal lines and the second control signal lines;

each of the first control signal lines is connected to the control terminals of the control transistors in odd-numbered rows and odd-numbered columns, and each of the first control signal lines is connected to the control terminals of the control transistors in even-numbered rows and even-numbered columns;

each of the second control signal lines is connected to the control terminal of the control transistors in odd-numbered rows and even-numbered columns, and each of the second control signal lines is connected to the control terminal of the control transistors in even-numbered rows and odd-numbered columns; and an odd-numbered column of the data signal lines is connected to the input terminal of the control transistors in an odd-numbered column, and an even-numbered column of the data signal lines is connected to the input terminal of the control transistors in an even-numbered column.

7. The 3D display device according to claim 1, wherein the OLED light-emitting devices in the grating comprise a white-d OLED light-emitting device, and the display panel comprises a color-blocking layer for at least blocking a red light, a green light and a blue light.

8. The 3D display device according to claim 1, wherein the grating is provided on a back surface of the display panel, and the display panel is a liquid crystal display panel.

9. The 3D display device according to claim 8, wherein the display panel includes a TFT array substrate and a color film substrate arranged opposite to each other, and a color filter substrate sandwiched between the TFT array substrate and the color film substrate, and the TFT array substrate is provided with a wire grid polarizer on a side facing away from a liquid crystal layer.

10. A method for driving a 3D display device according to claim 1, comprising:

applying an operating voltage to at least a first part of the OLED light emitting devices in the grating of the 3D display device, so that OLED light-emitting devices to which the operating voltage is applied emit light to form a bright grating cell.

11. The method for driving the 3D display device according to claim 10, further comprising:
applying a left-eye image signal to a first half of sub-pixels in the display panel of the 3D display device, and applying a right-eye image signal to a second half of sub-pixels in the display panel,
wherein first half of the sub-pixels to which the left-eye image signal is applied and the second half of the sub-pixels to which the right-eye image signal is applied are alternately arranged in the transverse direction, the bright grating units and the dark grating units of the grating are strip structures, and the bright grating units and the dark grating units are alternately arranged in the transverse direction.

12. The method for driving the 3D display device according to claim 10, further comprising:
applying a left-eye image signal to a first half of sub-pixels in the display panel of the 3D display device, and applying a right-eye image signal to a second half of sub pixels in the display panel,
wherein the first half of the sub-pixels to which the left-eye image signal is applied and the second half of the sub-pixels to which the right-eye image signal is applied are alternately arranged in the transverse direction and in the longitudinal direction, the bright grating cell and the dark grating cell are square structures, and the bright grating units and the dark grating units are arranged alternately in the transverse direction and alternately in the longitudinal direction.

13. A 3D display device, comprising a grating and a display panel, the grating being divided into a bright grating cell and a dark grating cell, wherein the grating comprises:
a substrate; and
a plurality of OLED light emitting devices arranged on the substrate,
wherein at least a part of the plurality of OLED light-emitting devices which emit light when an operating voltage is applied thereto form the bright grating cell, and the OLED light-emitting devices which do not emit light form the dark grating units;
wherein the grating comprises a first grating layer, an insulating layer and a second grating layer which are laminated on the substrate, the first grating layer comprises a first electrode layer, a first light-emitting layer and a second electrode layer laminated together, and the second grating layer comprises a third electrode layer, a second light-emitting layer and a fourth electrode layer laminated together; and
wherein,
the first electrode layer includes a plurality of first strip electrodes longitudinally extending and spaced-apart from each other, the first strip electrodes being connected to a first voltage signal terminal for providing a first voltage signal;
the second electrode layer comprises a plurality of second strip electrodes transversely extending and spaced apart from each other, the second strip electrodes being connected to a second voltage signal terminal for providing a second voltage signal, and an overlapping portion of the second strip electrodes and the first strip electrodes forming a first overlapping portion;

the third electrode layer comprises a plurality of third strip electrodes longitudinally extending and spaced apart from each other, the third strip electrodes being connected to the first voltage signal terminal; and
the fourth electrode layer comprises a plurality of fourth strip electrodes transversely spaced and spaced-apart from each other, the fourth strip electrodes being connected to the second voltage signal terminal, an overlapping portion of the fourth strip electrodes and the third strip electrodes forming a second overlapping portion, a vertical projection of the second overlapping portion on the substrate and a vertical projection of the first overlapping portion on the substrate being alternately arranged in the transverse direction and in the longitudinal direction.

14. The 3D display device according to claim 13, wherein the grating includes a plurality of repeating units, at least one control signal line and a plurality of data signal lines provided on the substrate; wherein:
each of the repeating units is provided with a control transistor and an OLED light-emitting device, an output terminal of the control transistor is connected to an anode of the OLED light-emitting device, and a cathode of the OLED light-emitting device is connected to ground;
the at least one control signal line extends in a transverse direction, and each control signal line is connected to a control terminal of the control transistor of at least one of the repeating units to control the control transistor to turn on or turn off; and
the data signal lines extend in a longitudinal direction, and each data signal line is connected to an input terminal of the control transistor of a respective one of the plurality of repeating units to cause the control transistor to output a voltage signal to the OLED light emitting device.

15. The 3D display device according to claim 14, wherein:
the repeating units are arranged in a line and there is one control signal line;
the control signal line is connected to the control terminal of each respective control transistor of the repeating units; and
an odd-numbered column of the data signal lines is connected to the input terminal of the control transistor in an odd-numbered position and an even-numbered column of the data signal lines is connected to the input terminal of the control transistor in an even-numbered position.

16. The 3D display device according to claim 14, wherein:
the repeating units are arranged in an array, and there are plurality of control signal lines;
an odd-numbered row of the control signal lines is connected to the control terminal of an odd-numbered row of control transistors, and an even-numbered row of the control signal lines is connected to the control terminal of an even-numbered row of control transistors; and
an odd-numbered column of the data signal lines is connected to the input terminal of an odd-numbered column of control transistors, and an even-numbered column of the data signal lines is connected to the input terminal of an even-numbered column of control transistors.

17. The 3D display device according to claim 14, wherein:
the repeating units are arranged in an array, and there are a plurality of control signal lines,
the control signal lines include first control signal lines and second control signal lines, and one row of repeating units corresponds to the first control signal lines and the second control signal lines;

an odd-numbered row of the first control signal lines is connected to the control terminal of control transistors in an odd-numbered row and odd-numbered column, and an even-numbered row of the first control signal lines is connected to the control terminal of control transistors in an even-numbered row and even-numbered column;

an odd-numbered row of the second control signal lines is connected to the control terminal of the control transistors in the odd-numbered row and the even-numbered column, and an even-numbered row of the second control signal lines is connected to the control terminal of the control transistors in the even-numbered row and the odd-numbered column; and an odd-numbered column of the data signal lines is connected to the input terminal of the control transistors in the odd-numbered column, and an even-numbered column of the data signal lines is connected to the input terminal of the control transistors in the even-numbered column.

18. The 3D display device according to claim 14, wherein:
the repeating units are arranged in an array, and there are plurality of control signal lines, and the control signal lines include first control signal lines and second control signal lines, and one row of repeating units corresponds to the first control signal lines and the second control signal lines;

each of the first control signal lines is connected to the control terminals of the control transistors in odd-numbered rows and odd-numbered columns, and each of the first control signal lines is connected to the control terminals of the control transistors in even-numbered rows and even-numbered columns;

each of the second control signal lines is connected to the control terminal of the control transistors in odd-numbered rows and even-numbered columns, and each of the second control signal lines is connected to the control terminal of the control transistors in even-numbered rows and odd-numbered columns; and an odd-numbered column of the data signal lines is connected to the input terminal of the control transistors in an odd-numbered column, and an even-numbered column of the data signal lines is connected to the input terminal of the control transistors in an even-numbered column.

19. The 3D display device according to claim 13, wherein the OLED light-emitting devices in the grating comprise a white-d OLED light-emitting device, and the display panel comprises a color-blocking layer for at least blocking a red light, a green light and a blue light.

20. The 3D display device according to claim 13, wherein the grating is provided on a back surface of the display panel, and the display panel is a liquid crystal display panel.

21. The 3D display device according to claim 20, wherein the display panel includes a TFT array substrate and a color film substrate arranged opposite to each other, and a color filter substrate sandwiched between the TFT array substrate and the color film substrate, and the TFT array substrate is provided with a wire grid polarizer on a side facing away from a liquid crystal layer.

22. A method for driving a 3D display device according to claim 13, comprising:
applying an operating voltage to at least a part of the OLED light emitting devices in the grating of the 3D display device, so that OLED light-emitting devices to which the operating voltage is applied emit light to form a bright grating cell.

23. The method for driving the 3D display device according to claim 22, further comprising:
applying a left-eye image signal to a first half of sub-pixels in the display panel of the 3D display device, and applying a right-eye image signal to a second half of sub-pixels in the display panel,
wherein first half of the sub-pixels to which the left-eye image signal is applied and the second half of the sub-pixels to which the right-eye image signal is applied are alternately arranged in the transverse direction, the bright grating units and the dark grating units of the grating are strip structures, and the bright grating units and the dark grating units are alternately arranged in the transverse direction.

24. The method for driving the 3D display device according to claim 22, further comprising:
applying a left-eye image signal to a first half of sub-pixels in the display panel of the 3D display device, and applying a right-eye image signal to a second half of sub pixels in the display panel,
wherein the first half of the sub-pixels to which the left-eye image signal is applied and the second half of the sub-pixels to which the right-eye image signal is applied are alternately arranged in the transverse direction and in the longitudinal direction, the bright grating cell and the dark grating cell are square structures, and the bright grating units and the dark grating units are arranged alternately in the transverse direction and alternately in the longitudinal direction.

* * * * *